United States Patent [19]
Garofalo et al.

[11] Patent Number: 5,649,011
[45] Date of Patent: Jul. 15, 1997

[54] METHOD FOR THE ADAPTIVE CONTROL OF A DIGITAL ECHO CANCELLER IN A TELECOMMUNICATION SYSTEM

[75] Inventors: Giovanni Garofalo, Lisse, Netherlands; Lars Svenkerud, Halden, Norway

[73] Assignee: Agence Spatiale Européenne, France

[21] Appl. No.: 346,091

[22] Filed: Nov. 29, 1994

[30] Foreign Application Priority Data

Dec. 2, 1993 [FR] France .................. 9314440

[51] Int. Cl.$^6$ ........................................... H04M 1/00
[52] U.S. Cl. .................. 379/410; 379/406; 379/411
[58] Field of Search ....................... 379/410, 411, 379/406; 370/32.1, 32; 375/231, 230, 229

[56] References Cited

U.S. PATENT DOCUMENTS

| | | |
|---|---|---|
| 4,578,544 | 3/1986 | Colin de Verdiere et al. . |
| 4,593,161 | 6/1986 | Desblache et al. . |
| 4,823,382 | 4/1989 | Martinez ................. 370/32.1 |
| 4,862,449 | 8/1989 | Hoefkens et al. ............ 370/32.1 |
| 5,050,160 | 9/1991 | Fuda ..................... 379/410 |

FOREIGN PATENT DOCUMENTS 0137508  4/1985  European Pat. Off. .

OTHER PUBLICATIONS

Dixième Colloque sur le Traitement du Signal et ses Applications, 20–24 May 1985, Nice, France, vol. 2, pp. 577–582, C. Galand et al., "Methode d'Initialisation Rapide D'Un Annuleur D'Echo et Mis en Oeuvre Sur Processeur de Signal".

*Primary Examiner*—Ahmad F. Matar
*Assistant Examiner*—Keith Ferguson
*Attorney, Agent, or Firm*—Cummings & Lockwood

[57] ABSTRACT

The echo canceller digital filter is first set to zero. Then a test signal is sent through the down link to the echo canceller and the filter taps are adjusted until the echo signal in the up link to the echo canceller is less than a predetermined stored reference level. The test signal is then removed and the number of filter taps having signal samples nearing zero and/or the number of filter taps having significant signal samples is determined and thereafter the taps having non-significant signal samples are eliminated for making the echo canceller ready for operation.

1 Claim, 3 Drawing Sheets

METHOD FOR THE ADAPTIVE CONTROL OF A DIGITAL ECHO CANCELLER IN A TELECOMMUNICATION SYSTEM

FIELD OF THE INVENTION

The present invention relates to the elimination of the echo signals in telecommunication links, more particularly in satellite telecommunication links.

BACKGROUND OF THE INVENTION

When an impulse is received at the input of a terminal station from a far-end terminal station an impulse echo is produced in the return path towards the far-end terminal station. The echo signals are currently eliminated by connecting an echo canceller at the terminal stations of the telecommunication system.

In particular, digital echo cancellers are used to provide an echo estimate of the incoming signal, which echo estimate is subtracted from the echo signal produced in the return path. A digital echo canceller essentially comprises a digital filter including a number of delay cells. Such a filter is controlled by adjusting the coefficients of each cell in such a way as to obtain the suitable impulse response which is a fairly exact replica of the echo signal.

An echo impulse appearing in an up link shows a response curve that depends on the delay created by the user terminal circuits. These circuits include a 4-wire circuit directly connected to the up and down links and a 2-wire circuit connected to the user side. Each of said circuits generates a respective delay and produces in the return path echo samples which extend over a relatively long period of time.

The total delay introduced by these circuits, and consequently the number of samples, currently varies from one telephone link to the other. Therefore the echo cancellers used so far in the satellite communication systems are controlled to cover the major part of the echo samples produced both by the 4-wire and 2-wire circuits. By way of consequence, the filters used in these known digital echo cancellers must comprise a great number of delay cells, the control of which requires a great number of filter taps to be adjusted and high computer power and time for performing the required control.

SUMMARY OF THE INVENTION

It is the object of the invention to reduce the number of filter taps to be adjusted in a digital echo canceller and thereby to reduce the total time required for controlling the echo canceller and the computer power required for operating a digital echo canceller.

Accordingly, this invention provides a method for an adaptive and fast control of an echo canceller digital filter.

Briefly, use is made of a test signal which is launched through an incoming or down link to a terminal station and the digital filter is adjusted using the impulse response from the echo path.

DESCRIPTION OF THE INVENTION

Figure 1:
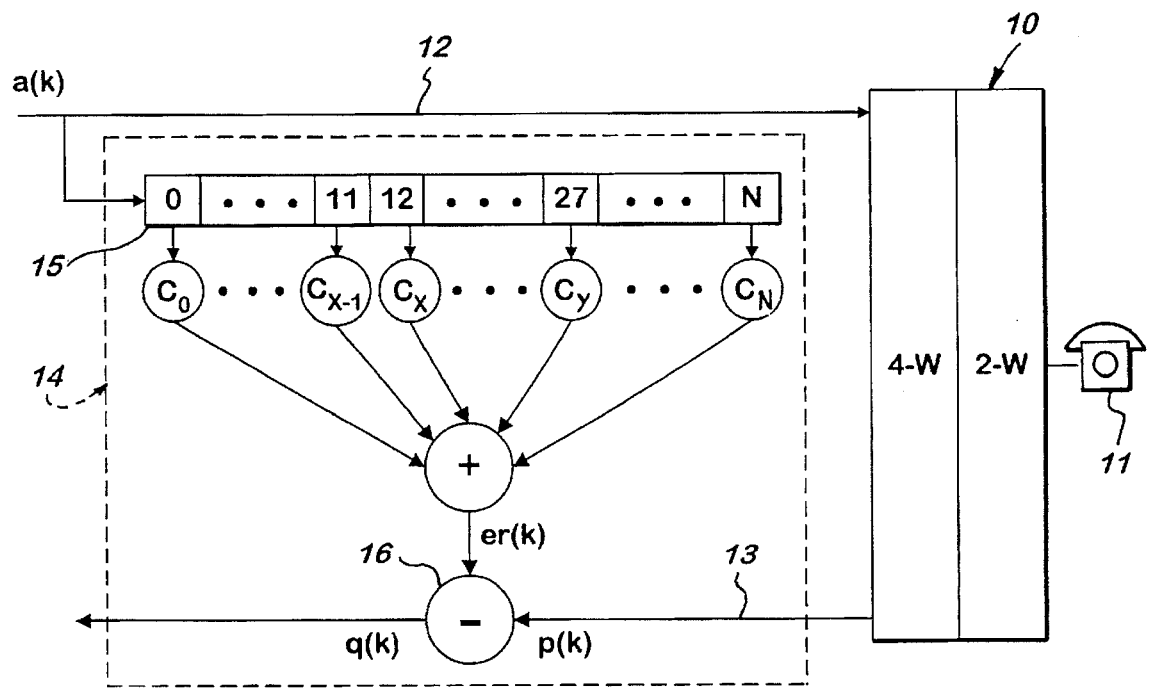
FIG. 1 is a schematic diagram of a digital echo canceller connected to a user terminal.

FIG. 1 schematically represents a user terminal 10 having a local subscriber set 11 connected thereto. The user terminal 10 is connected to a down link 12 and an up link 13 which establish communications with a communication satellite. The terminal 10 comprises 4-wire circuits for connection to the down link 12 and the up link 13 and 2-wire circuits for connection to the subscriber set. Between the down and up links there is connected a digital echo canceller 14 having the task to eliminate the echo signals p(k) produced in the up link 13 by the signals a(k) received in the down link 12.

The echo canceller 14 essentially comprises a digital filter 15, the input of which is connected to receive the incoming signals in the down link 12. The digital filter 15 comprises a plurality of delay cells having respective taps denoted $C_0 \ldots C_{X-1}, C_X, \ldots C_Y \ldots C_N$.

The echo canceller uses the samples from the filter taps to construct an impulse replica er(k) of the echo signal p(k) and substract it from the echo signal p(k) in a subtractor 16 whereby the echo signal is eliminated from the useful signal q(k) being sent in the up link.

Figure 2:
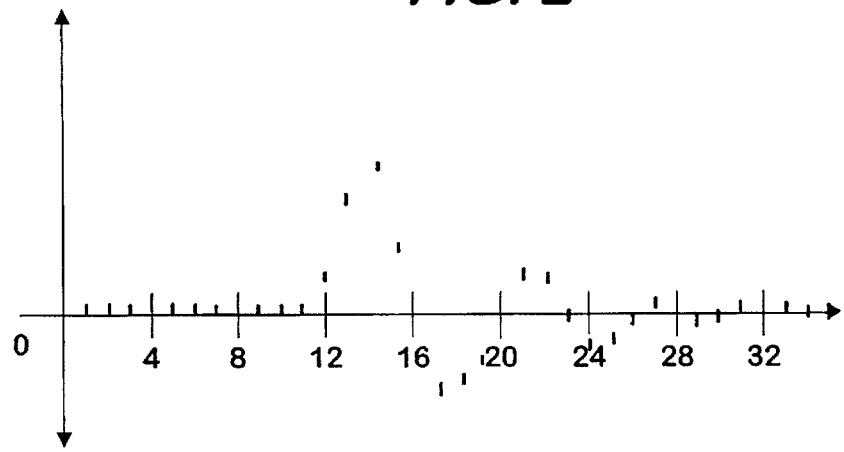
FIG. 2 shows the typical impulse response of an exemplary echo signal.

FIG. 2 shows a typical impulse response of an echo path. The impulse response can be divided into three parts: a first part wherein the samples have all a zero value (his part comprises the sample 0 to 11), a second part (samples 12 to 27) wherein the samples have non-zero values, and a third part (from sample 28 onwards) wherein the samples have a substantially zero value. The task assigned to the echo canceller is to synthesize an echo replica er(k) having exactly the same response as the echo response p(k).

The usual method for synthesizing the echo replica consists in using the samples included in the first and second parts of the impulse response. The samples included in the third part of the impulse response are omitted since they can only give a very small contribution to the total echo signal.

Figure 3:
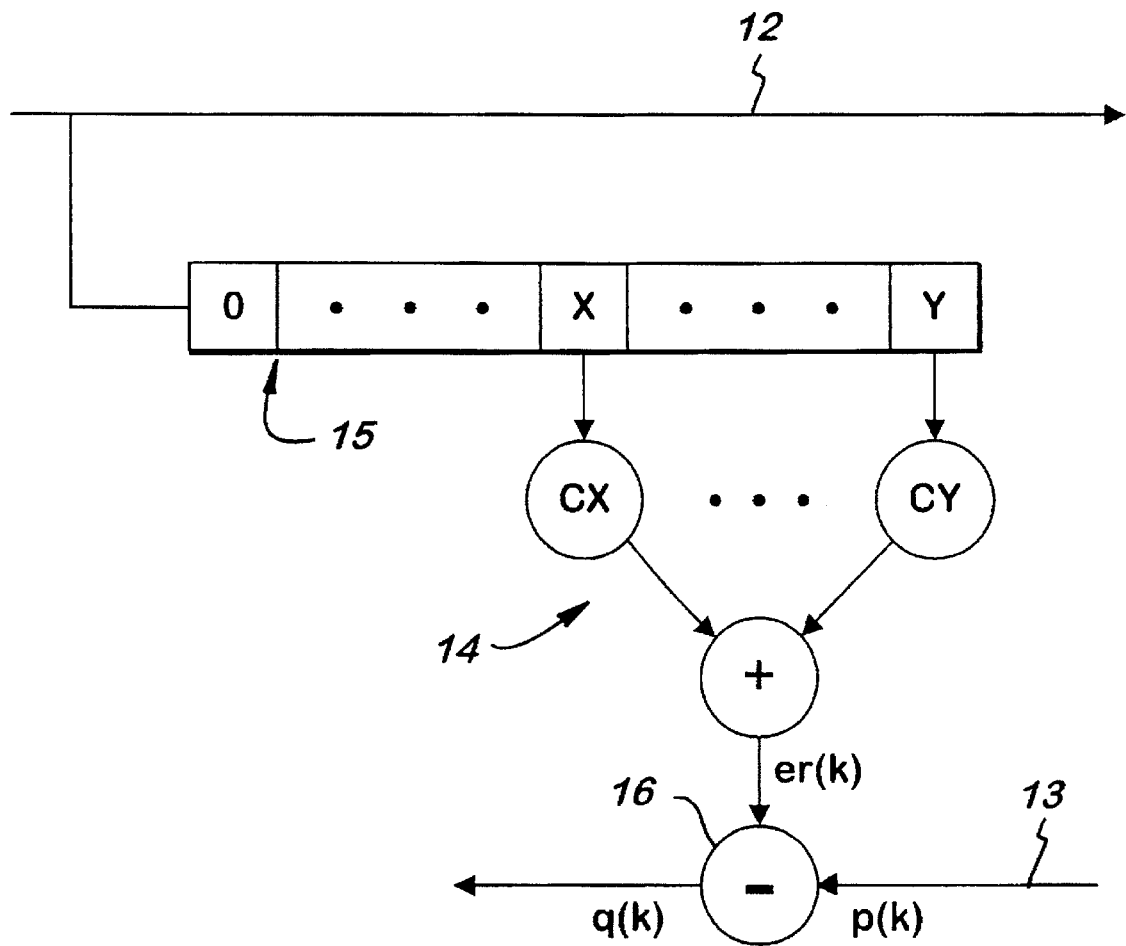
FIG. 3 illustrates the configuration of a digital echo canceller operating in accordance with the invention.

This invention provides a method capable of automatically determining the number of filter cells in which the samples have a zero value, thereby making it possible to control the echo canceller such that it can operate with the samples included in the second part only of the impulse response. When it is controlled in accordance with the invention, the echo canceller operates as depicted in FIG. 3.

Figure 4:
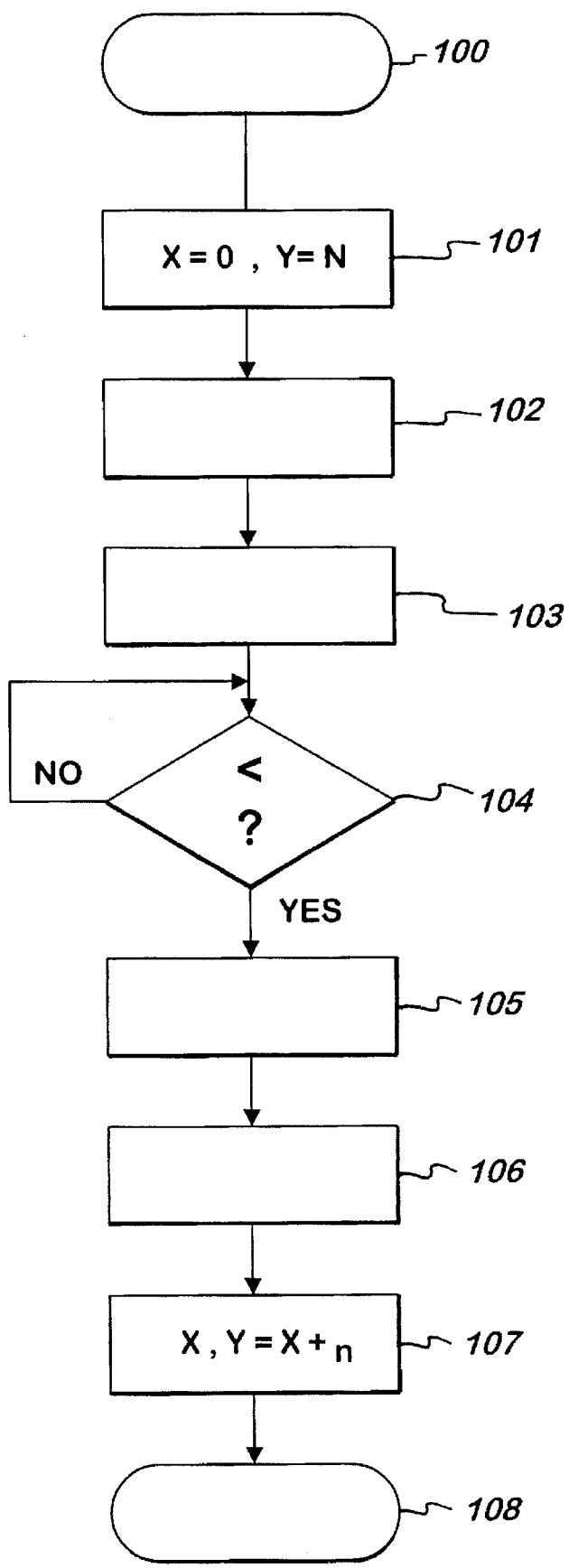
FIG. 4 is a flow chart illustrating the adaptive control method of the invention.

The method of this invention is described hereafter with reference to the flow chart shown in FIG. 4. The method is carried out by a processor (known per se) under the control of a suitable software.

The control method starts at block 100. The first step consists in setting X to 0 and Y to a value N as large as possible (block 101). Then a test signal is sent in the down link (block 102) and the filter taps are adjusted to achieve echo canceller convergence (block 103). The processor monitors the value of the echo signal p(k) in the return path and compares same with a stored reference value (block 104).

When the residual echo is lower than the reference value, the test signal is removed and the filter coefficients are freezed (block 105) in order to find the number X of coefficients having a zero value (block 106). Thereafter, the processor defines and stores the numbers X and Y (block 107). The value Y is computed from the maximum delay in a subscriber 2-wire loop, e.g. 2 ms par sample time slot for a telephone system with 125 μs sample time slots. The required number of filter taps will thus be 16.

The taps $C_0$–$C_{X-1}$ are then omitted, which terminates the process (block 108). The echo canceller is thus ready to operate with the configuration as shown in FIG. 3. In operation, only the samples provided in the second part of the impulse response are thereby used by the echo canceller to synthesize the echo replica's er(k).

We claim:

1. A method for the adaptive control of a digital filter in a digital echo canceller connected to up and down telecommunication links, said digital filter having a plurality of delay cell taps the method comprising the steps of:

(a) setting the digital filter to zero, (b) sending a test signal through the down telecommunication link, (c) adjusting the filter taps until the echo signal in the up telecommunication link is less than a predetermined stored reference level, (d) removing the test signal, (e) fixing the filter taps, (f) determining the number of filter taps having signal samples nearing zero or the number of filter taps having significant signal samples, and (g) eliminating the taps having non-significant signal samples for operation of the digital echo canceller.

* * * * *